United States Patent [19]

Matsumoto et al.

[11] Patent Number: 4,921,466
[45] Date of Patent: May 1, 1990

[54] OUTPUT PROCESSING CIRCUIT FOR RADIO FREQUENCY RECEIVER

[75] Inventors: Yutaka Matsumoto, Yokohama; Tadaharu Shimazu, Tokyo, both of Japan

[73] Assignee: Kabushiki Kiasha Toshiba, Kawasaki, Japan

[21] Appl. No.: 235,868

[22] Filed: Aug. 24, 1988

[30] Foreign Application Priority Data

Aug. 25, 1987 [JP] Japan ................................ 62-210770

[51] Int. Cl.$^5$ .......................... H04B 1/16; H04B 1/10
[52] U.S. Cl. .................................... 455/214; 455/295; 455/336
[58] Field of Search ............... 455/205, 307, 309, 310, 455/312, 313, 214, 295, 336, 337, 155, 226, 295, 135, 134, 219, 234; 329/111, 130; 381/13

[56] References Cited

U.S. PATENT DOCUMENTS

| | | | |
|---|---|---|---|
| 3,821,649 | 6/1974 | Grosjean | 455/155 |
| 4,186,351 | 1/1980 | Brefini et al. | 455/226 |
| 4,219,778 | 8/1980 | Ishii | 455/155 |
| 4,525,868 | 6/1985 | Kage et al. | 455/295 |

*Primary Examiner*—Reinhard J. Eisenzopf
*Assistant Examiner*—Curtis Kuntz
*Attorney, Agent, or Firm*—Finnegan, Henderson, Farabow, Garrett and Dunner

[57] ABSTRACT

An output processing circuit comprises a level detector for detecting a level of a signal corresponding to an intensity of a reception electric field, a gradient controller for controlling a gradient of a signal level detected by the level detector so as to correspond to the intensity of the electric field, a potential slider including a level shifter having a variable shift amount for shifting the level detected by the level detector by a predetermined amount, and an output control circuit for processing a reception signal in accordance with an output level from the potential slider. The output processing circuit includes a level shifter having a variable level shift amount for shifting the level of the signal detected by the level detector by a predetermined amount. The operation range of the output control circuit is continuously changed.

32 Claims, 7 Drawing Sheets

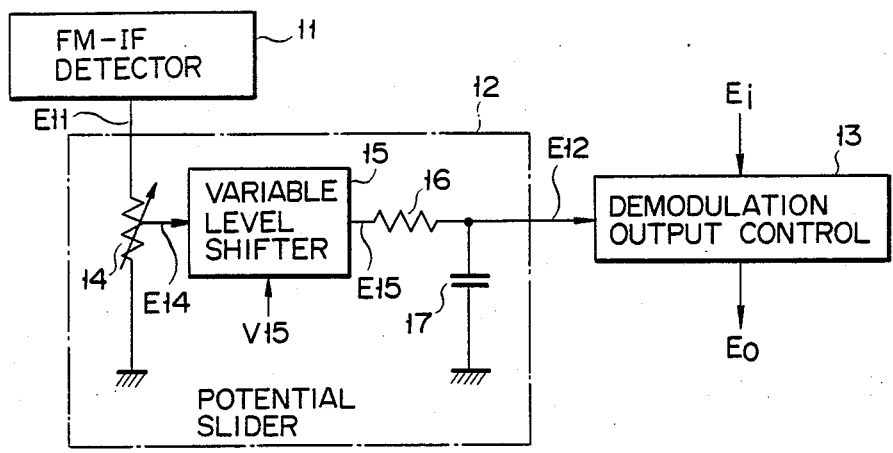
F I G. 4
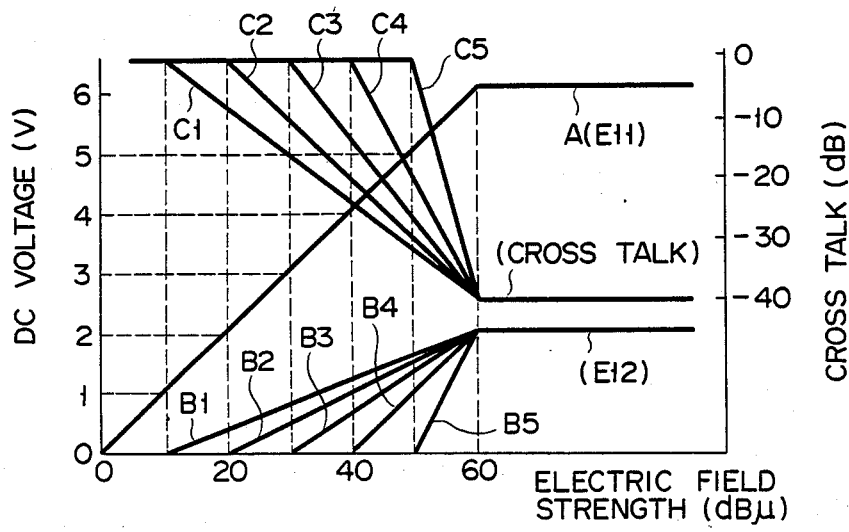
F I G. 5

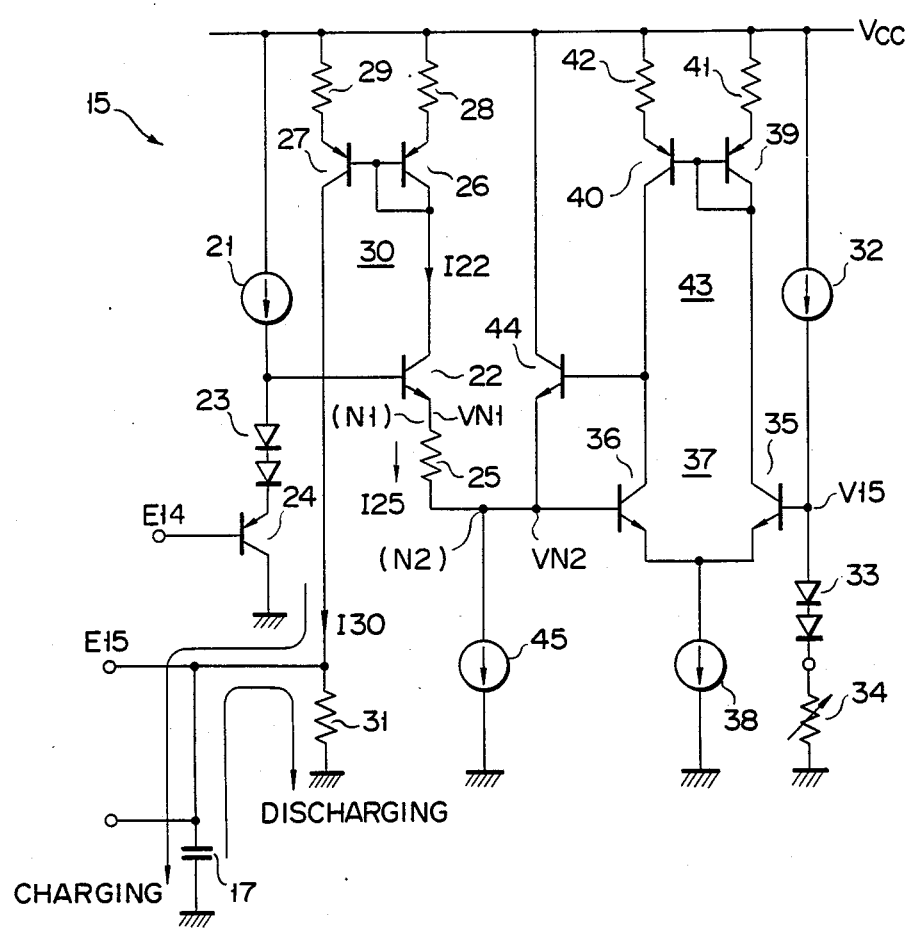
F I G. 6

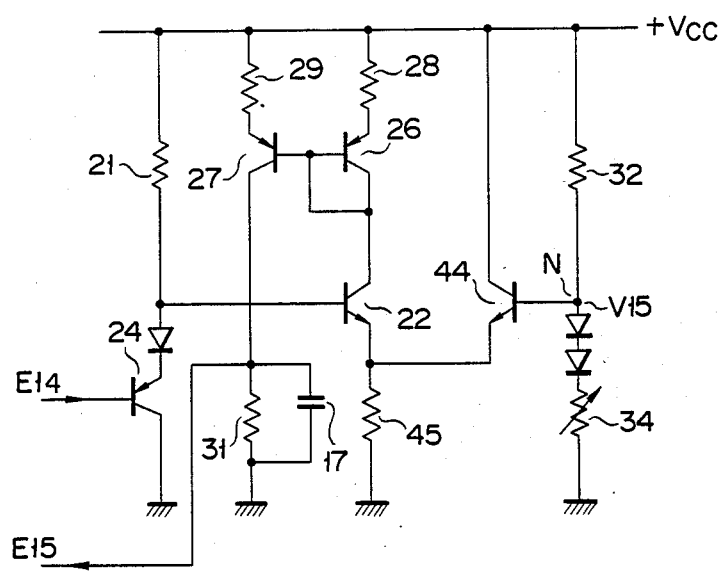
F I G. 7

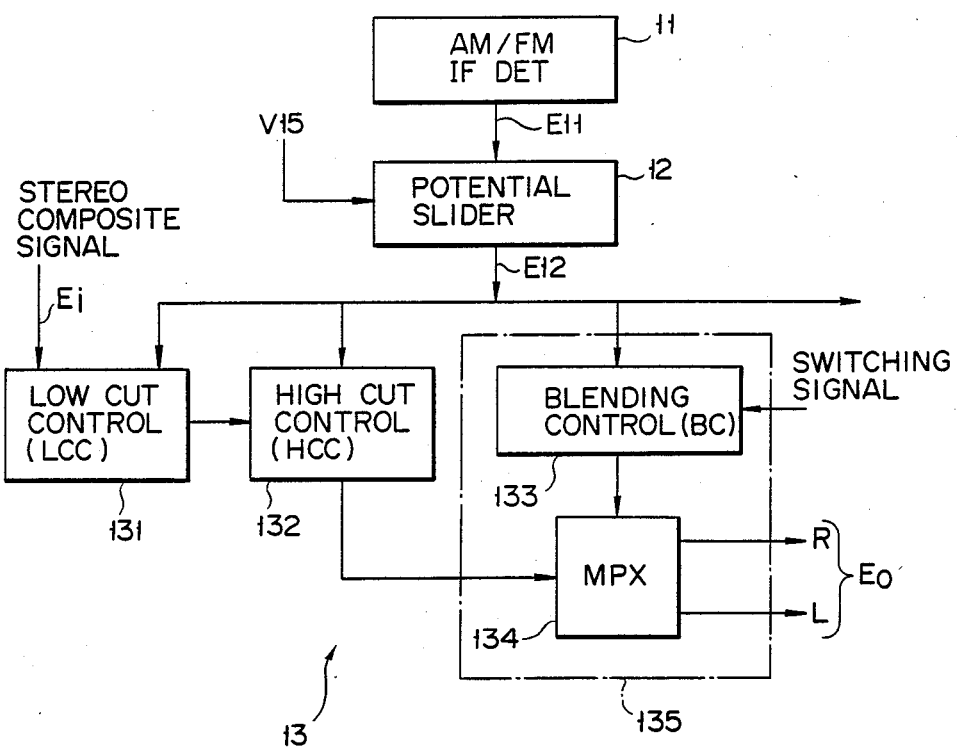
F I G. 8

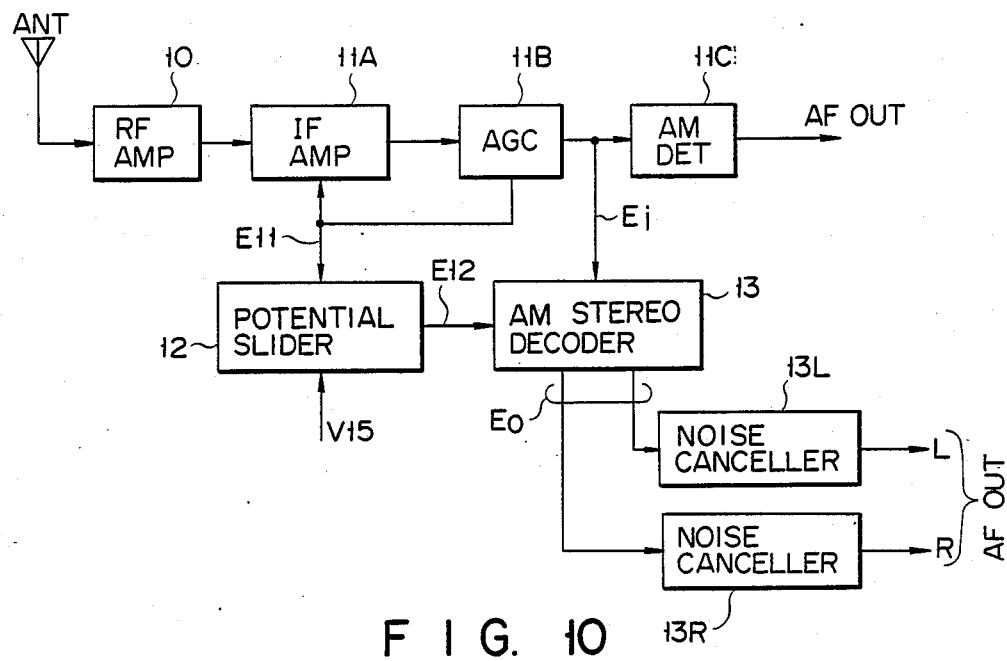
F I G. 10
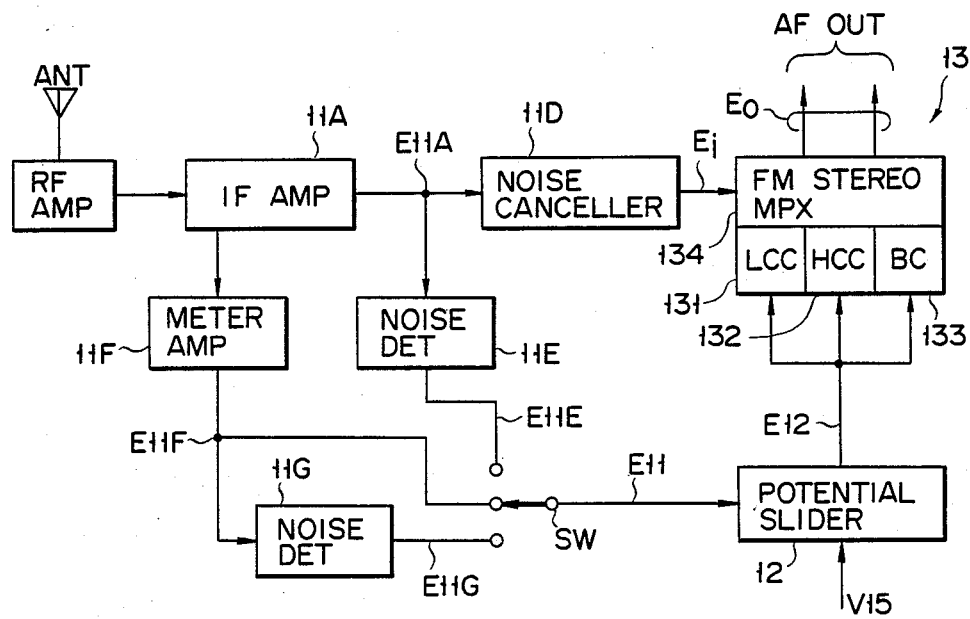
F I G. 11

OUTPUT PROCESSING CIRCUIT FOR RADIO FREQUENCY RECEIVER

BACKGROUND OF THE INVENTION

1. Field of the Invention

The present invention relates to an output processing circuit for a radio frequency receiver, which is incorporated in an AM/FM RF receiver, particularly, a vehicle FM stereo receiver to perform demodulation output processing such as stereo separation characteristic control and control for removing high- and low-frequency components.

2. Description of the Prior Art

In a vehicle AM or FM stereo receiver, the intensity of a reception electric field is not necessarily constant. Therefore, proper implementations must be provided to maintain good tone quality even if the intensity of the electric field is changed. For example, a detector output (signal meter output) having a level corresponding to the intensity of the electric field is utilized to control stereo separation characteristics and high- and low-frequency characteristics in the range from a low intensity to an intermediate intensity of the electric field in accordance with the present intensity of the electric field, thereby obtaining comfortable tone quality.

FIG. 1 is a block diagram showing a conventional arrangement of an FM demodulation output processing circuit to improve tone quality in the range of the low intensity to the intermediate intensity of the electric field.

Signal meter output E61 corresponding to the intensity of an electric field and generated by FM internal frequency detector (FM-IF detector) 61 is supplied through potential slider 62 to demodulation output control circuit 63 including a blender for controlling right- and left-channel separation of a stereo signal.

Potential slider 62 includes a time constant circuit comprising semivariable resistor 64, constant voltage element 65 having a diode or an LED, resistor 66, and capacitor 67. The DC level of signal meter output E61 is shifted or slid by a predetermined amount. The gradient of signal meter output E61 with respect to the electric field intensity is controlled by semivariable resistor 64.

Assume that the level of signal meter output E61 from FM-IF detector 61 is changed to characteristic curve A in FIG. 2 in accordance with the intensity of the electric field. In this case, the value of constant voltage element 65 in potential slider 62, i.e., a level slide or shift amount is preset to be, e.g., 2 V, and the gradient controlled by semivariable resistor 64 with respect to the intensity of the electric field is present to be 2 V/40 dBµ. In this case, output E62 from potential slider 62 is represented by characteristic curve B shown in FIG. 2. A cross-talk characteristic curve of the blender in modulation output control circuit 63 which receives output E62 from potential slider 62 is represented by curve C in FIG. 2.

FIG. 3 is a graph showing the relationship between output control signal E62 from potential slider 62 and the cross-talk component. This relationship is extracted from the graph in FIG. 2. When this cross-talk characteristic curve is obtained, right and left-channel separation can be controlled in proportion to the intensity of the electric field in the range from the low intensity to the intermediate intensity as the cross-talk component is decreased with a higher intensity of the electric field.

The amount of noise in the stereo-separated audio signal is in inverse proportion to the cross-talk component. Therefore, best tone quality with suppressed noise can be always obtained. When modulation output control circuit 63 comprises a high cut controller for cutting off a high-frequency component and a low cut controller for cutting off a low-frequency component in place of the blender, the high- and low-frequency components can be cut off in accordance with the present intensity of the electric field.

The operation range (D in FIG. 2) of demodulation output control circuit 63 must be flexibly changed in correspondence with FM receiver markets. However, in the FM demodulation output control circuit in FIG. 1, the voltage value of constant voltage element 65 is fixed, and level shift amounts (i.e., slide amounts) can be set to be only discrete values. For this reason, the values defining operation range D in FIG. 2 are also discrete values. For example, when one Si diode is used as constant voltage element 65, the level shift amount is set to be about 0.7 V. When two series-connected Si diodes are used, the level shift amount is set to be about 1.4 V. When an LED is used as constant voltage element 65, the level shift amount is set to be about 1.7 V to 2 V. As a result, the operation range of the conventional demodulation output control circuit cannot be flexibly changed in correspondence with the respective markets. In this manner, in a conventional arrangement, the operation range of demodulation output control of the RF receiver cannot be continuously changed.

SUMMARY OF THE INVENTION

The present invention has been made in consideration of the above situation, and has as its object to provide an output processing circuit for an RF receiver, which can continuously change the operation range of demodulation output so as to flexibly correspond to the respective markets.

An output processing circuit according to the present invention comprises a level detector (11) for detecting a level of a signal corresponding to an intensity of a reception electric field, a gradient controller (14) for controlling a gradient of a signal level (E11) detected by the level detector (11) so as to correspond to the intensity of the electric field, a potential slider (12) including a level shifter (15) having a variable shift amount for shifting the level (E11) detected by the level detector (11) by a predetermined amount, and an output control circuit (13) for processing a reception signal (Ei) in accordance with an output level (E12) from the potential slider (12).

The output processing circuit according to the present invention includes the level shifter having a variable level shift amount for shifting the level of the signal detected by the level detector by a predetermined amount. The operation range of the output control circuit can be continuously changed.

BRIEF DESCRIPTION OF THE DRAWINGS

FIG. 4 shows an FM receiver output processing circuit including a potential slider (12) according to the present invention;

FIG. 5 is a graph for explaining the characteristics of the output processing circuit shown in FIG. 4;

FIG. 6 is a circuit diagram showing an arrangement when the potential slider (12) in the output processing circuit in FIG. 4 is formed as an IC;

FIG. 7 is a circuit diagram of a modification showing a simplified arrangement of the circuit arrangement in FIG. 6;

FIG. 8 is a block diagram showing a detailed arrangement of a receiver output processing circuit (13) employing the potential slider (12) shown in FIG. 4;

FIG. 10 is a block diagram showing a detailed arrangement of an AM stereo receiver output processing circuit employing the potential slider (12) shown in FIG. 4; and FIG. 11 is a block diagram showing a detailed arrangement of an FM stereo receiver output processing circuit employing the potential slider (12) shown in FIG. 4.

DETAILED DESCRIPTION OF THE PREFERRED EMBODIMENT

Figure 1:
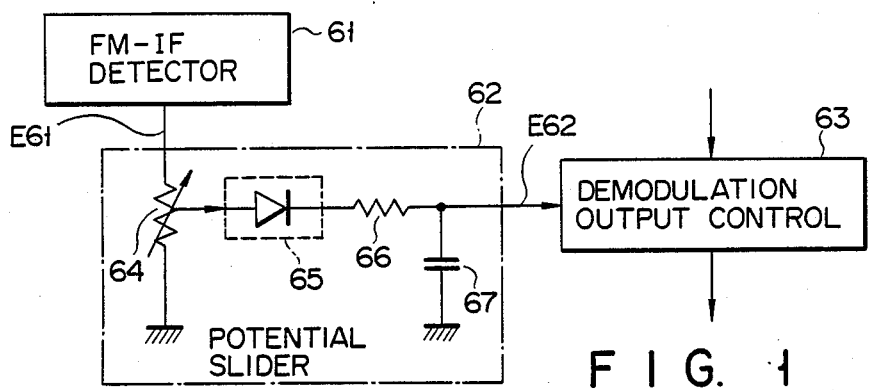
FIG. 1 shows a conventional output processing circuit for an RF receiver.
Figure 2:
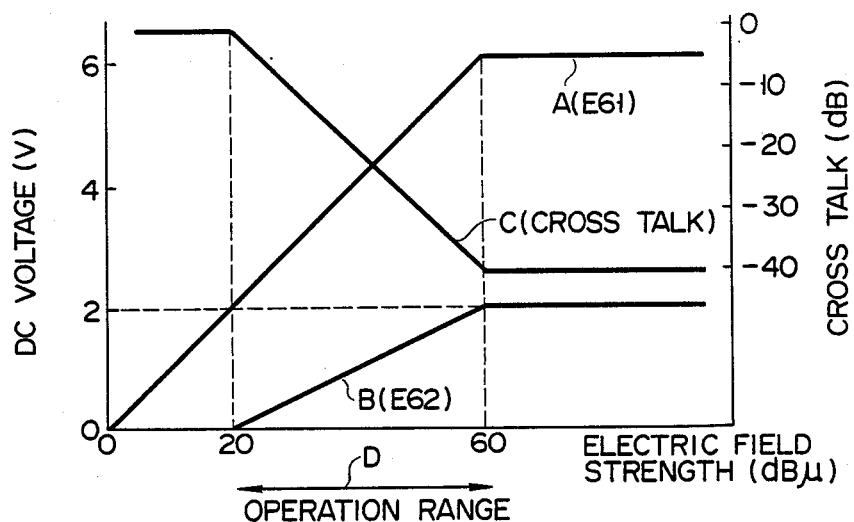
FIG. 2 is a graph for explaining characteristics of the output processing circuit shown in FIG. 1.
Figure 3:
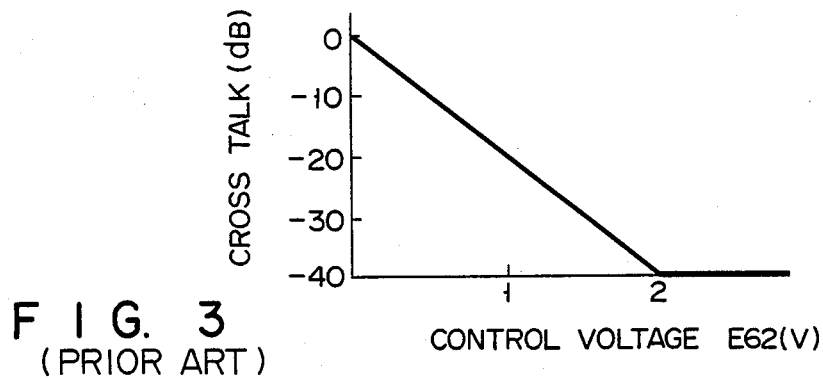
FIG. 3 is a graph obtained by extracting cross-talk characteristics as a function of a control voltage from the characteristics in FIG. 2.

An embodiment of the present invention will be described in detail with reference to the accompanying drawings. FIG. 4 is a block diagram showing an arrangement of a demodulation output control circuit according to the present invention.

Reference numeral 11 denotes an FM internal frequency detector (FM-IF detector) Signal level output Ell from FM-IF detector 11 is supplied to demodulation output control circuit 13 through potential slider 12. Control circuit 13 also receives demodulated composite signal Ei and performs demodulation output processing such as blending control for changing a degree of stereo separation, and high cut control for cutting off a high-frequency component and/or low cut control for cutting off a low-frequency component on the basis of control signal E12 output from potential slider 12.

Potential slider 12 includes a time constant circuit consisting of semivariable resistor 14, variable level shifter 15, resistor 16, and capacitor 17. Level E14 corresponding to the signal meter output is shifted by variable level shifter 15 by a predetermined amount. The gradient of signal meter output Ell with respect to the intensity of the electric field is controlled by semivariable resistor 14.

Assume that the level of signal meter output Ell from FM-IF detector 11 is changed as indicated by characteristic curve A in FIG. 5. In this case, the value of variable level shifter 15 in potential slider 12, i.e., a potential slide amount is preset to be 1 V in accordance with control signal V15, and the gradient controlled by semivariable resistor 14 with respect to the intensity of the electric field is preset to be 2 V/50 dBμ. In this case, an output from potential slider 12 is represented by characteristic curve B1 in FIG. 5. In this case, when demodulation output control circuit 13 includes a blending controller serving as a stereo separation control circuit, its cross-talk component is represented by characteristic curve C1 in FIG. 5.

The potential slide amounts of variable level shifter 15 are set to be 2 V, 3 V, 4 V, and 5 V in accordance with control signal V15, and the gradients controlled by semivariable resistor 14 with respect to the intensity of the electric field are set to be 2 V/40 dBμ, 2 V/30 dBμ, 2 V/20 dBμ, and 2 V/10 dBμ. In this case, outputs from potential slider 12 are represented by characteristic curves B2, B3, B4, and B5 in FIG. 5, and the cross-talk characteristics are represented by curves C2, C3, C4, and C5 in FIG. 5. The potential slide amount in variable level shifter 15 can be continuously changed in accordance with control signal V15. The operation range of demodulation output control circuit 13 can be continuously changed accordingly.

As a result, the operation range of flexible demodulation output processing such as stereo separation control, and high cut control and/or low cut control can be flexibly changed so as to correspond to the respective FM receiver markets FIG. 6 is a circuit diagram showing an arrangement of variable level shifter 15 shown in FIG. 4. One terminal of constant current source 21 is connected to power source Vcc, and the other terminal of constant current source 21 is connected to the base of npn transistor 22 and the anode of diode 23. The emitter of pnp transistor 24 is connected to the cathode of diode 23, and the collector of transistor 24 is grounded. Signal meter output E14 which is obtained by level-adjusting an output from FM-IF detector 11 by semivariable resistor 14 is supplied to the base of transistor 24. The emitter of transistor 22 is connected to one terminal N1 of resistor 25, and the collector of transistor 22 is connected to the collector of pnp transistor 26.

The base of transistor 26 is connected to its collector and to the base of pnp transistor 27. Resistors 28 and 29 are connected between the emitters of transistors 26 and 27 and power source Vcc. Transistors 26 and 27 and resistors 28 and 29 constitute current mirror circuit 30. Current mirror circuit 30 causes the collector of transistor 27 to output current I30 proportional to collector current I22 of transistor 22. Resistor 31 is connected between the collector of transistor 27 and ground. A voltage drop (E15) across resistor 31 serves as control signal E12 supplied to demodulation output control circuit 13 through time constant circuit (16 and 17). Capacitor 17 is slowly charged by collector current I30 of transistor 27. Capacitor 17 is quickly discharged through resistor 31 In this manner, the charging time constant of capacitor 17 is different from its discharging time constant. More specifically, capacitor 17 is quickly discharged with a decrease (a decrease in intensity of the electric field) in signal E11. Capacitor 17 is slowly charged with an increase (an increase in intensity of the electric field) in signal E11.

With the above arrangement, when the intensity of the electric field is abruptly reduced, high-frequency noise and the like can be cut off by an abrupt change in signal E15 within a short period of time. However, when the intensity of the electric field is abruptly increased, signal E15 is changed slowly enough to prevent an unnatural change in frequency range or stereo channel separation of a received tone.

One terminal of constant current source 32 is connected to power source Vcc. The other terminal of constant current source 32 is connected to the anode of diode 33. Variable resistor 34 is connected between the cathode of diode 33 and ground. The base of npn transistor 35 is connected to the anode of diode 33. The emitter of transistor 35 is connected to the emitter of npn transistor 36. Transistors 35 and 36 constitute differential pair 37. Constant current source 38 is connected between the common emitter of differential pair 37 and ground.

Current mirror circuit 43 consisting of two pnp transistors 39 and 40 and resistors 41 and 42 and serving as a current load is connected between the collectors of transistors 35 and 36 and power source Vcc. The base of npn transistor 44 is connected to the collector of transistor 36, and the emitter of transistor 44 is connected to the base of transistor 36. The collector of transistor 44 is connected to power source Vcc. Constant current source 45 is connected between ground and the emitter of transistor 44. The other terminal N2 of resistor 25 is connected to the base of transistor 36.

Differential pair 37, current mirror circuit 43, npn transistor 44, and constant current source 45 constitute a buffer amplifier for amplifying base voltage V15 of transistor 35 with a gain of 1. The buffer amplifier amplifies anode voltage V15 of diode 33 and supplies the amplified voltage to the other terminal N2 of resistor 25.

In variable level shifter 15 having the above arrangement, voltage V15 obtained by adding forward drop voltage VF of diode 33 to the voltage corresponding to the resistance of variable resistor 34 and a current value of constant current source 32 appears at the anode of diode 33. Voltage VN2 equal to voltage V15 appears at base N2 of transistor 36. If the resistance of variable resistor 34 is set to be 0 Ω, the base voltage (VN2) of transistor 36 serves as forward-biasing drop voltage VF. This value is given to be, e.g., 0.7 V.

Signal meter output voltage E14 applied to the base of transistor 24 is transmitted to emitter N1 of transistor 22 through transistor 24, diode 23, and transistor 22. Therefore, voltage VN1 at emitter N1 is a voltage obtained by adding forward drop voltage (0.7 V) of one p-n junction to level-adjusted signal meter output voltage E14. When the adjusted signal meter output voltage is set to be 0 V, the emitter voltage of transistor 22 is also 0.7 V.

In this state, when signal meter output voltage E14 is increased, emitter voltage VN1 of transistor 22 is increased accordingly. Current I25 starts flowing through resistor 25. This current I25 serves as an emitter current of transistor 22. Collector current I22 substantially equal to current I25 is input to current mirror circuit 30. In this case, output current I30 from current mirror circuit 30 is supplied to resistor 31, and voltage drop E15 across resistor 31 occurs. In this case, if circuit constants are preset such that a gain of control output voltage E1S is constant (or gain of 1), signal meter output voltage E14 is proportional to control output voltage E15.

In this state, when the resistance of variable resistor 34 is increased to increase base voltage VN2 of transistor 36, the voltage value of control signal E15 is shifted (decreased) by an increased voltage component. When variable level shifter 15 having the arrangement described above is used, external components excluded from an IC are semivariable resistor 14, variable resistor 34, and other CRs (16 and 17). Most of the circuit elements can be incorporated in the IC. For this reason, the number of components can be reduced, and cost is also reduced. Incidentally, semivariable resistor 14 can be exchanged by resistor 31.

FIG. 7 shows a modification having a simplified arrangement of the circuit arrangement of FIG. 6. Signal meter output E14 is supplied to the base of pnp transistor 24. The collector of transistor 24 is grounded, and its emitter is connected to positive power source Vcc through resistor 21. The emitter of transistor 24 is connected to the base of npn transistor 22, with its emitter grounded through resistor 45.

The collector of transistor 22 is connected to the collector and base of pnp transistor 26 and the base of pnp transistor 27. The emitters of transistors 26 and 27 are connected to power source Vcc through corresponding resistors 28 and 29. The collector of transistor 27 is grounded through a parallel circuit of resistor 31 and capacitor 17. A voltage drop of resistor 31 and the collector current of transistor 27 serve as control signal E15.

The emitter of npn transistor 44 is connected to the emitter of transistor 22. The collector of transistor 44 is connected to power source Vcc, and its base is connected to connecting node N between resistor 32 and variable resistor 34. A series circuit of resistor 32 and variable resistor 34 is inserted between the power source Vcc circuit and the ground circuit.

In the arrangement of FIG. 7, a potential slide amount between signals E15 and E14 can be continuously changed in accordance with base voltage V15 of transistor 44.

FIG. 8 is a block diagram showing an application arrangement of a practical FM receiver IC according to the present invention. Signal meter output E11 output from FM-IF detector 11 is supplied to potential slider 12 arranged as in FIG. 6 or 7. Output E12 obtained upon adjustment completion of a potential slide amount in slider 12 is supplied to low-frequency cut controller (LCC) 131, high-frequency cut controller (HCC) 132, and stereo separation controller 135 as part of demodulation output control circuit 13. Separation controller 135 comprises blending controller 133 and R- and L-signal demodulation multiplexer (MPX) 134. LCC 131 and HCC 133 cut the low- and high-frequency components of composite signal Ei in accordance with the present intensity of the electric field. A frequency-cut composite signal is supplied to multiplexer 134.

Blending controller 133 is called a blender for controlling a phase of a 38-kHz switching signal supplied from a frequency divider (not shown) in accordance with output level E12 from potential slider 12. Multiplexer 134 outputs R and L signals EO having a degree of separation in accordance with the present intensity of the electric field.

Figure 9:
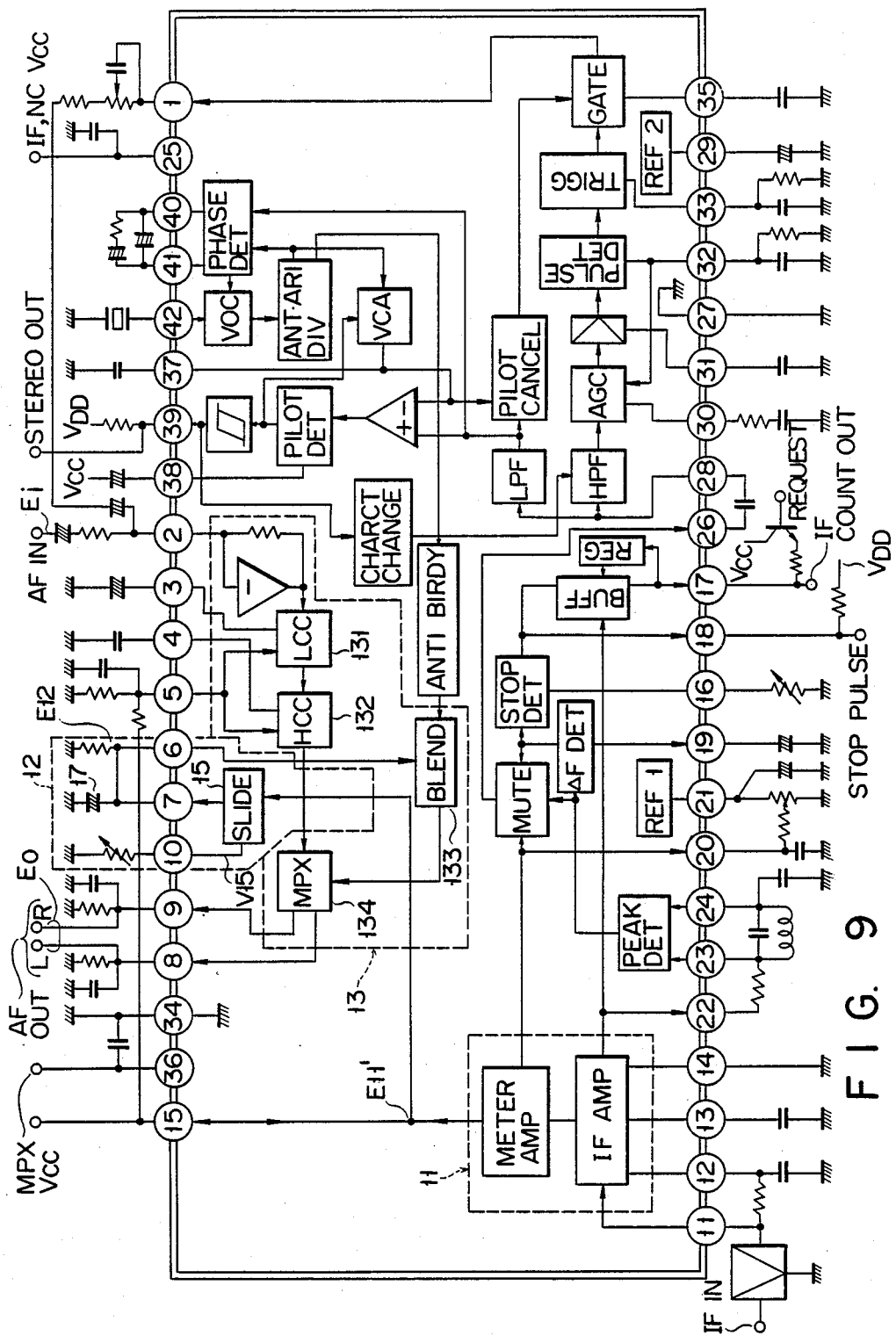
FIG. 9 is a block diagram showing an internal arrangement when the receiver output processing circuit having the potential slider (12) shown in FIG. 4 is formed as an IC.

FIG. 9 shows an internal arrangement of an FM/AM receiver output processing IC with potential slider 12 shown in FIG. 4.

In this arrangement, signal meter output E11' extracted from a meter amplifier in IF amplifier 11 is supplied to variable level shifter 15. Control signal E15 obtained by shifting output E11' by a predetermined potential by variable level shifter 15 is supplied to blending controller 133. In this embodiment, signal meter output E11' is supplied to LCC 131 and HCC 132 as a characteristic control signal without being through variable level shifter 15. However, output E11' may be supplied through variable level shifter 15.

FIG. 10 shows a detailed arrangement of an AM stereo receiver output processing circuit employing potential slider 12 in FIG. 4.

In this arrangement, an AGC output from AGC amplifier 11B for automatically controlling the gain of IF amplifier 11A in accordance with the intensity of the reception electric field is supplied to potential slider 12 as signal E11. Output E12 from slider 12 is supplied to AM stereo decoder 13. A potential slide amount of output E12 from signal E11 can be continuously controlled in accordance with control voltage V15. After channel separation is adjusted in accordance with control voltage V15, stereo signal E0 serves as L and R stereo outputs AFout through noise cancellers 13L and 13R.

FIG. 11 shows a detailed arrangement of an FM stereo receiver output processing circuit employing potential slider 12 shown in FIG. 4. In this arrangement three inputs E11 to potential slider 12 are prepared.

First, a noise level of output E11A from IF amplifier 11A is detected by noise detector 11E, detection output E11E is selected by switch SW, and this is input to potential slider 12 as signal E11. Second, output E11F from meter amplifier 11F connected to IF amplifier 11A is selected by switch SW, and this signal is input to potential slider 12 as output E11F. Third, a noise level of output E11F is detected by noise detector 11G, detection output E11G is selected by switch SW, and the selected signal is supplied to potential slider 12 as signal E11 (in practice, one of signals E11E, E11F, and E11G may be selected as output E11 and be input to slider 12 without using switch SW).

When one (E11) of the signals which is selected by switch SW is input to potential slider 12, slider 12 slides the potential level of signal E11 in accordance with control voltage V15. As a result, output E12 is supplied to LCC 131, HCC 132, and/or BC 133 in demodulation output control circuit 13.

Output E11A from IF amplifier 11A is input as composite signal Ei to FM stereo multiplexer 134 in demodulation output control circuit 13 through noise canceller 11D. Multiplexer 134 generates L and R stereo outputs AFout (E0) from composite signal Ei in accordance with the frequency characteristics and channel separation so as to correspond to the operating states of LCC 131, HCC 132, and/or BC 133.

The present invention is not limited to the particular embodiment described above. Various changes and modifications may be made within the spirit and scope of the invention. In the above embodiment, variable level shifter 15 in potential slider 12 has the arrangement shown in FIG. 6 or 7. However, the arrangement of variable level shifter 15 is not limited to this if the level shift amount or potential slide amount can be continuously changed.

In the embodiment of FIG. 4, in potential slider 12, signal meter output E14 from FM-IF detector 11 is supplied to variable level shifter 15 through semivariable resistor 14. However, after level shifting by variable level shifter 15 is completed, the level of signal E15 may be adjusted by semivariable resistor 14. A variable resistor can be used instead of a semivariable resistor. The present invention is also applicable to a TV receiver or the like in addition to an AM/FM radio receiver.

According to the present invention as has been described above, there is provided an FM demodulation output processing circuit which can continuously change the operation range of the demodulation output control circuit so as to correspond to the respective markets.

What is claimed is:

1. An output processing circuit for a receiver for receiving a radio frequency signal at various intensities of an electric field, comprising:
   first circuit means for generating a first signal having a signal level corresponding to the intensity of the electric field of the received radio frequency signal;
   second circuit means, connected to said first circuit means via the first signal, for continuously changing a potential slide voltage of the first signal in accordance with a predetermined control potential and generating a second signal which varies in response to the intensity of the electric field of the received radio frequency signal and having a DC level corresponding to the predetermined control potential; and
   third circuit means, connected to said second circuit means via the second signal, for performing predetermined signal processing of information included in the radio frequency signal on the basis of the second signal and generating an output signal corresponding to the information.

2. A circuit according to claim 1, wherein said second circuit means includes means for adjusting a magnitude of the first signal with respect to a magnitude of the intensity of the electric field.

3. A circuit according to claim 1, wherein said second circuit means includes a time constant circuit having a first time constant for an increase in the intensity of the electric field and a second constant for a decrease in the intensity of the electric field, the first and second time constants being determined such that the DC level change of the second signal for the decrease in the intensity of the electric field is faster than the DC level change of the second signal for the increase in the intensity of the electric field.

4. A circuit according to claim 1, wherein said first circuit means includes a radio or television tuner internal frequency amplifier and a circuit for outputting as the first signal a signal corresponding to an amplitude of a signal amplified by said internal frequency amplifier.

5. A circuit according to claim 1, wherein said first circuit means includes a radio or television tuner internal frequency amplifier, and an automatic gain controller for controlling a gain of said internal frequency amplifier in accordance with an AGC signal such that an amplitude of a signal amplified by said internal frequency amplifier is substantially constant, the AGC signal serving as the first signal.

6. A circuit according to claim 1, wherein said first circuit means includes a radio or television tuner internal frequency amplifier and a noise detector for detecting a noise component of a signal amplified by said internal frequency amplifier, the signal detected by said noise detector serving as the first signal.

7. A circuit according to claim 1, wherein said first circuit means includes a radio or television tuner internal frequency amplifier and a meter amplifier for generating a signal meter output corresponding to an amplitude of a signal amplified by said internal frequency amplifier, the signal meter output serving as the first signal.

8. A circuit according to claim 1, wherein said first circuit means includes a radio or television tuner internal frequency amplifier, a meter amplifier for generating a signal meter output corresponding to an amplitude of a signal amplified by said internal frequency amplifier, and a detector for detecting a noise component of the signal meter output, the signal detected by said detector serving as the first signal.

9. A circuit according to claim 1, wherein said third circuit means includes a filter having frequency characteristics changed in accordance with the DC level of the second signal.

10. A circuit according to claim 1, wherein said third circuit means includes a filter having frequency characteristics changed in accordance with the DC level of the first signal.

11. A circuit according to claim 1, wherein said second circuit means includes:
comparing means for comparing a potential corresponding to the first signal with the predetermined control potential and outputting a comparison result;
current output means, connected to said comparing means, for outputting a current corresponding to the comparison result; and
means for generating the second signal corresponding to the current from said current output means.

12. A circuit according to claim 1, wherein said second circuit means further comprises a variable level shifter responsive to said predetermined control signal for changing said potential slide voltage.

13. A circuit according to claim 1, wherein said second circuit means further comprises means for controlling the gradient of said first signal with respect to the intensity of said electric field.

14. A circuit according to claim 1, wherein said second circuit means continuously changes the operation range of said third circuit means.

15. An output processing circuit for a receiver for receiving a radio frequency signal at various intensities of an electric field, comprising:
first circuit means for generating a first signal having a signal level corresponding to the intensity of the electric field of the received radio frequency signal;
second circuit means, connected to said first circuit means via the first signal for continuously sliding a DC level of the first signal in accordance with a predetermined control potential and generating a second signal which varies in response to the intensity of the electric field of the received radio frequency signal and having a DC level corresponding to the predetermined control potential; and
third circuit means, connected to said second circuit means via the second signal, for performing predetermined signal processing of information included in the radio frequency signal on the basis of the second signal and generating an output signal corresponding to the information;
said third circuit means including a stereo decoder having stereo separation characteristics changed in accordance with the DC level of the second signal.

16. A circuit according to claim 15, wherein said stereo decoder is an AM stereo decoder.

17. A circuit according to claim 15, wherein said stereo decoder is an FM stereo decoder.

18. A circuit according to claim 15, wherein said second circuit means includes means for adjusting a magnitude of the first signal with respect to a magnitude of the intensity of the electric field.

19. A circuit according to claim 15, wherein said second circuit means includes a time constant circuit having a first time constant for an increase in the intensity of the electric field and a second constant for a decrease in the intensity of the electric field, the first and second time constants being determined such that the DC level change of the second signal for the decrease in the intensity of the electric field is faster than the DC level change of the second signal for the increase in the intensity of the electric field.

20. A circuit according to claim 15, wherein said first circuit means includes a radio or television tuner internal frequency amplifier and a circuit for outputting as the first signal a signal corresponding to an amplitude of a signal amplified by said internal frequency amplifier.

21. A circuit according to claim 15, wherein said first circuit means includes a radio or television tuner internal frequency amplifier, and an automatic gain controller for controlling a gain of said internal frequency amplifier in accordance with an AGC signal such that an amplitude of a signal amplified by said internal frequency amplifier is substantially constant, the AGC signal serving as the first signal.

22. A circuit according to claim 15, wherein said first circuit means includes a radio or television tuner internal frequency amplifier and a noise detector for detecting a noise component of a signal amplified by said internal frequency amplifier, the signal detected by said noise detector serving as the first signal.

23. A circuit according to claim 15, wherein said first circuit means includes a radio or television tuner internal frequency amplifier and a meter amplifier for generating a signal meter output corresponding to an amplitude of a signal amplified by said internal frequency amplifier, the signal meter output serving as the first signal.

24. A circuit according to claim 15, wherein said first circuit means includes a radio or television tuner internal frequency amplifier, a meter amplifier for generating a signal meter output corresponding to an amplitude of a signal amplified by said internal frequency amplifier, and a detector for detecting a noise component of the signal meter output, the signal detected by said detector serving as the first signal.

25. A circuit according to claim 15, wherein said third circuit means includes a filter having frequency characteristics changed in accordance with the DC level of the second signal.

26. A circuit according to claim 15, wherein said third means includes a filter having frequency characteristics changed in accordance with the DC level of the first signal.

27. A circuit according to claim 15, wherein said second circuit means includes:
comparing means for comparing a potential corresponding to the first signal with the predetermined control potential and outputting a comparison result;
current output means, connected to said comparing means, for outputting a current corresponding to the comparison result; and
means for generating the second signal corresponding to the current from said current output means.

28. An FM demodulation output processing circuit, comprising:
an FM level detector for detecting a level of an FM internal frequency signal;
a potential sliding circuit comprising gradient control means for adjusting a rate of change of the level detected by said FM level detector with respect to an electric field intensity of an FM radio signal corresponding to the FM internal frequency signal, and variable level shifting means for shifting the level detected by said FM level detector by a predetermined shift amount; and a demodulation output control circuit for performing processing of a signal corresponding to the level detected by said FM level detector in accordance with an output level from said potential sliding circuit.

29. A circuit according to claim 28, wherein said demodulation output control circuit includes a stereo separation control circuit for controlling a degree of separation of a stereo demodulation signal.

30. A circuit according to claim 28, wherein said demodulation output control circuit includes a high-frequency cut controller for cutting a high-frequency component of the demodulation signal.

31. A circuit according to claim 28, wherein said demodulation output control circuit includes a low-frequency cut controller for cutting a low-frequency component of the demodulation signal.

32. A circuit according to claim 28, wherein said level shifting means comprises a variable resistor, a first current source for supplying a constant current to said variable resistor, a buffer amplifier for amplifying a voltage drop across said variable resistor, a first transistor of a first conductivity type and having a base which receives a signal detected by said FM level detector, a second current source for supplying a predetermined emitter current to said first transistor, a second transistor of a second conductivity type and having a base connected to an emitter of said first transistor, a first resistive element, one terminal of which is connected to an emitter of said second transistor and the other terminal of which receives an output from said buffer amplifier, and a second resistive element which receives a current having a value corresponding to the emitter current of said second transistor, wherein the voltage drop across said second resistive element is output to said demodulation output control circuit.

* * * * *

UNITED STATES PATENT AND TRADEMARK OFFICE
CERTIFICATE OF CORRECTION

PATENT NO. : 4,921,466
DATED : May 01, 1990
INVENTOR(S) : Yutaka MATSUMOTO et al.

It is certified that error appears in the above-identified patent and that said Letters Patent is hereby corrected as shown below:

Title page, item (73):

In the Assignee, please delete "Kiasha" and insert --Kaisha--.

Signed and Sealed this

Twenty-first Day of July, 1992

*Attest:*

DOUGLAS B. COMER

*Attesting Officer*     *Acting Commissioner of Patents and Trademarks*